US008964191B2

(12) United States Patent
Ataka

(10) Patent No.: US 8,964,191 B2
(45) Date of Patent: Feb. 24, 2015

(54) PRINTING APPARATUS, PRINTING METHOD, CONTROL PROGRAM, AND RECORDING MEDIUM

(75) Inventor: Hiroyuki Ataka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 2255 days.

(21) Appl. No.: 11/185,867

(22) Filed: Jul. 21, 2005

(65) Prior Publication Data

US 2006/0017952 A1 Jan. 26, 2006

(30) Foreign Application Priority Data

Jul. 22, 2004 (JP) ................................. 2004-214694

(51) Int. Cl.
G06F 3/12 (2006.01)
(52) U.S. Cl.
CPC ............ *G06F 3/1288* (2013.01); *G06F 3/1204* (2013.01); *G06F 3/1229* (2013.01); *G06F 3/1263* (2013.01)
USPC .......................... 358/1.13; 358/1.14; 358/1.15
(58) Field of Classification Search
USPC ............. 358/1.9, 1.13, 1.14, 1.15, 1.16, 1.18, 358/296
See application file for complete search history.

(56) References Cited

U.S. PATENT DOCUMENTS

| 6,897,972 | B1 * | 5/2005 | Noda ............................ 358/1.15 |
| 7,148,991 | B2 * | 12/2006 | Suzuki et al. ................... 358/1.5 |
| 7,158,244 | B2 * | 1/2007 | Sommer et al. ............... 358/1.13 |
| 2003/0076525 | A1 | 4/2003 | Hikawa |

FOREIGN PATENT DOCUMENTS

| JP | 2003-131831 A | 5/2003 |
| JP | 2004-001320 A | 1/2004 |

* cited by examiner

*Primary Examiner* — Vu B Hang
(74) *Attorney, Agent, or Firm* — Birch, Stewart, Kolasch & Birch, LLP

(57) ABSTRACT

A printing apparatus includes (a) a pass-over processing section for managing print processing order of the jobs, and for controlling the image forming section such that a shortage job is skipped and the print processing is carried out with respect to each of succeeding jobs coming after the shortage job in the print processing order, the shortage job being a job which is so judged by the device condition managing section as to cause a shortage of the source; and (b) a proximate job judgment section for judging whether or not the shortage job and a proximate job need to be consecutively print-processed, by comparing (i) job information included in the shortage job with (ii) job information of the proximate job. In cases where the proximate job judgment section judges that the shortage job and the proximate job need to be sequentially print-processed, the pass-over processing section controls the image forming section such that the shortage job, judged to be print-processed in continuity with the proximate job, is not skipped for print processing with respect to the succeeding jobs coming after the shortage job, until completion of the print processing of the shortage job.

17 Claims, 8 Drawing Sheets

FIG. 2

| |
|---|
| JOB PASS-OVER DESIGNATION |
| JOB CLASSIFICATION |
| IP (INTERNET PROTOCOL) ADDRESS |
| COPY NUMBER |
| PRINTING DIRECTION |
| SHEET SIZE |
| SHEET TYPE |
| FEEDING TRAY INFORMATION |
| DISCHARGING TRAY INFORMATION |
| BOTH-SIDE PRINT INFORMATION |
| STAPLE INFORMATION |
| PUNCH INFORMATION |
| USER NAME |

FIG. 3 (a)

PROCESSED

| JOB 0 | IP ADDRESS A |
|---|---|

UNPROCESSED/BEING-PROCESSED

| JOB 1 | IP ADDRESS A (FIRST AND SECOND PAGES: PRINTED) |
|---|---|
|  | IP ADDRESS A (THIRD TO FIFTH PAGES: NO SHEET) |
| JOB 2 | IP ADDRESS B |
| JOB 3 | IP ADDRESS A |
| JOB 4 | IP ADDRESS C |

↓

PRINTING DONE

| JOB 0 | IP ADDRESS A |
|---|---|
| JOB 1 | IP ADDRESS A (FIRST AND SECOND PAGES) |

FIG. 3 (b)

PROCESSED

| JOB 0 | IP ADDRESS A |
|---|---|

UNPROCESSED

| JOB 1 | IP ADDRESS A (NO SHEET) |
|---|---|
| JOB 2 | IP ADDRESS B |
| JOB 3 | IP ADDRESS A |
| JOB 4 | IP ADDRESS C |

↓

PRINTING DONE

| JOB 0 | IP ADDRESS A |
|---|---|

FIG. 3 (c)

PROCESSED

| JOB 0 | IP ADDRESS A |
|---|---|

UNPROCESSED

| JOB 1 | IP ADDRESS B (NO SHEET) |
|---|---|
| JOB 2 | IP ADDRESS A |
| JOB 3 | IP ADDRESS C |
| JOB 4 | IP ADDRESS B |

↓

PRINTING DONE

| JOB 0 | IP ADDRESS A |
|---|---|
| JOB 2 | IP ADDRESS A |
| JOB 3 | IP ADDRESS C |
| JOB 4 | IP ADDRESS B |

FIG. 3 (d)

PROCESSED

| JOB 0 | IP ADDRESS A |
|---|---|

UNPROCESSED

| JOB 1 | IP ADDRESS B (NO SHEET) |
|---|---|
| JOB 2 | IP ADDRESS B |
| JOB 3 | IP ADDRESS B |
| JOB 4 | IP ADDRESS A |
| JOB 5 | IP ADDRESS B |
| JOB 6 | IP ADDRESS C |

↓

PRINTING DONE

| JOB 0 | IP ADDRESS A |
|---|---|
| JOB 4 | IP ADDRESS A |
| JOB 5 | IP ADDRESS B |
| JOB 6 | IP ADDRESS C |

FIG. 4 (a)

PROCESSED

| JOB 0 | IP ADDRESS A |
|---|---|

UNPROCESSED

| JOB 1 | IP ADDRESS B (NO SHEET) |
|---|---|
| JOB 2 | IP ADDRESS B |
| JOB 3 | IP ADDRESS B |
| JOB 4 | IP ADDRESS A |
| JOB 5 | IP ADDRESS C |
| JOB 6 | IP ADDRESS B |

↓

PRINTING DONE

| JOB 0 | IP ADDRESS A |
|---|---|
| JOB 4 | IP ADDRESS A |

←SHEET SUPPLY FOR JOB 1

↓

PRINTING DONE

| JOB 0 | IP ADDRESS A |
|---|---|
| JOB 4 | IP ADDRESS A |
| JOB 1 | IP ADDRESS B |
| JOB 2 | IP ADDRESS B |
| JOB 3 | IP ADDRESS B |
| JOB 5 | IP ADDRESS C |
| JOB 6 | IP ADDRESS B |

FIG. 4 (b)

PROCESSED

| JOB 0 | IP ADDRESS A |
|---|---|

UNPROCESSED

| JOB 1 | IP ADDRESS B (NO SHEET) |
|---|---|
| JOB 2 | IP ADDRESS B |
| JOB 3 | IP ADDRESS B |
| JOB 4 | IP ADDRESS A |
| JOB 5 | IP ADDRESS B |
| JOB 6 | IP ADDRESS C |

↓

PRINTING DONE

| JOB 0 | IP ADDRESS A |
|---|---|
| JOB 4 | IP ADDRESS A (PARTIALLY PRINTED) |

←SHEET SUPPLY FOR JOB 1

↓

PRINTING DONE

| JOB 0 | IP ADDRESS A |
|---|---|
| JOB 4-1 | IP ADDRESS A |
| JOB 1 | IP ADDRESS B |
| JOB 2 | IP ADDRESS B |
| JOB 3 | IP ADDRESS B |
| JOB 4-2 | IP ADDRESS A |
| JOB 5 | IP ADDRESS B |
| JOB 6 | IP ADDRESS C |

US 8,964,191 B2

PRINTING APPARATUS, PRINTING METHOD, CONTROL PROGRAM, AND RECORDING MEDIUM

This Nonprovisional application claims priority under 35 U.S.C. §119(a) on Patent Application No. 2004/214694 filed in Japan on Jul. 22, 2004, the entire contents of which are hereby incorporated by reference.

FIELD OF THE INVENTION

The present invention relates to a printing apparatus having a pass-over processing function, and to a printing method.

BACKGROUND OF THE INVENTION

Conventionally proposed is a printing apparatus for effectively carrying out print processing such that an inexecutable (unprintable) print job is passed over and a waiting print job is processed (printed, executed) when processing a plurality of print jobs. What makes a print job inexecutable is a print source shortage such as a sheet shortage, or the like. Hereinafter, each print job is simply referred to as "job".

Such a structure for passing over the inexecutable job and processing the waiting job is described in, e.g., Japanese Laid-Open Patent Publications 1 and 2 (hereinafter, respectively referred to as patent documents 1 and 2).

The structure disclosed in the patent document 1 judges, before printing (processing) a job, whether or not there are sheets required for the printing, and does not carry out the printing when there are no sheets. When judging that there are no sheets during the processing of the job, the structure stops the printing and processes a waiting job. When stopping the printing, the structure disclosed in the patent document 1 judges priority of the other (waiting) jobs, and carries out pass-over processing in accordance with the priority.

Meanwhile, the structure disclosed in the patent document 2 carries out printing such that: when error occurrence makes it impossible for ongoing printing to go on, a next job is processed. Further, when another error occurrence makes it impossible for the ongoing processing of the next job to go on, the structure processes a further next job. In other words, the structure disclosed in the patent document 2 suspends the printing, i.e., the processing of the job in response to the error occurrence, and processes an executable (printable, processible) waiting job.

[The Patent Document 1]
Japanese Laid-Open Patent Publication Tokukai 2003-131831 (published on May 9, 2003; corresponding to U.S. Patent Publication 2003/0076525A1)

[The Patent Document 2]
Japanese Laid-Open Patent Publication Tokukai 2004-1320 (published on Jan. 8, 2004)

However, in cases where the error such as the sheet shortage occurs upon the processing of the job and the error accordingly makes it impossible for the printing to go on, each of the conventional structures passes over (skips) the inexecutable job and processes a waiting job irrespective of nature of the inexecutable job. Specifically, the pass-over processing is carried out even in, e.g., the following cases (1) and (2): (1) a job coming before the inexecutable job, and the inexecutable job are correlated with each other, and the jobs need to be sequentially processed; and (2) the inexecutable job and a waiting job are one series, and a user wishes that the waiting job is processed after the inexecutable job.

More specifically, as a result of the pass-over processing carried out by the structure shown in the patent document 1, pass-over printing is carried out such that the jobs are processed in order from a job having the highest priority. In this case, the jobs are re-queued in accordance with the priority, and are processed in the order of the priority, even in cases where, e.g., there are a series of jobs correlated with the job suspended by the error. In other words, each of the correlated jobs cannot be processed just after the job suspended by the error.

On the other hand, the structure disclosed in the patent document 2 does not also take into account the correlation with the inexecutable job, and processes a mere executable one of the waiting jobs.

Namely, each of the conventional structures suffers from such a problem that: the pass-over processing is carried out even in cases where there are a plurality of jobs correlated with each other, with the result that an irrelevant job is processed between the correlated jobs.

Further, for attainment of effective pass-over processing in the structure disclosed in the patent document 1, the priority needs to be given to all the jobs. This requires the user to manually carry out such a bothersome priority giving.

SUMMARY OF THE INVENTION

The present invention is made to provide a printing apparatus for improving usability by judging whether or not an inexecutable (unprintable) job is to be passed over and a waiting job is to be processed.

To achieve the object, a printing apparatus according to the present invention includes: (a) a job processing section for carrying out print processing with respect to received jobs; (b) a detecting section for detecting whether or not there is a source required for the print processing of each of the jobs; (c) a job control section for managing print processing order of the jobs, and for controlling the job processing section such that a shortage job is skipped and the print processing is carried out with respect to each of succeeding jobs coming after the shortage job in the print processing order, the shortage job being either a job that has order to be next print-processed, or a job that is being print-processed, and the shortage job being a job which is so judged by the detecting section as to cause a shortage of the source; and (d) a judgment section for judging whether or not the shortage job and a job which comes just before the shortage job need to be consecutively print-processed by comparing (i) job information, which is included in the shortage job and which includes at least identification information for identifying (1) a print processing condition of the job and/or (2) the job, with (ii) job information of the job which comes just before the shortage job, in cases where the judgment section judges that the shortage job and the job which comes just before the shortage job need to be sequentially print-processed, the job control section controlling the job processing section such that the shortage job, judged to be print-processed in continuity with the job which comes just before the shortage job, is not skipped for print processing with respect to the succeeding jobs coming after the shortage job, until completion of the print processing of the shortage job.

The wording "a job that has order to be next print-processed" refers to a job, to be processed next, of unprocessed jobs. In other words, the wording "a job that has order to be next print-processed" refers to an unprocessed job, having order to be next print-processed, of unprocessed jobs.

Further, the job control section determines the print order of the received jobs so as to manage the print processing order. Specifically, for example, the job control section normally determines the print processing order in accordance with the order in which the jobs are received; however, when a sheet shortage causes an error during print processing of a job, the job control section determines the print processing order such that the job (shortage job) suspended by the error is skipped and a job coming just after the job is print-processed.

Further, each of the jobs includes job information. The job information includes at least identification information for identifying (i) a print processing condition of the job, and/or (ii) the job. Examples of the print processing condition include: (i) size of a sheet used for the print processing of the job; (ii) copy number, and the like. Further, examples of the identification information include: addresser information indicating a addresser of the job; a name of a user who produced the job; and the like.

Normally, in cases where the job pass-over processing is carried out, image forming is carried out with respect to a job that can be subjected to the image forming, and that comes after the job which was so judged as to cause the source shortage.

According to the above structure, the judgment section makes a comparison between (i) job information of the shortage job and (ii) job information of the job which comes just before the shortage job so as to judge whether or not the shortage job and the job which comes just before the shortage job need to be sequentially print-processed. Specifically, the judgment section judges that the shortage job and the job which comes just before the shortage job need to be sequentially processed in the case where, e.g., the comparison between the job information of the shortage job and the job information of the job which comes just before the shortage job clarifies that the identification information of the shortage job and the identification information of the job which comes just before the shortage job are coincide with each other. Moreover, the judgment section judges that the shortage job and the job which comes just before the shortage job need to be sequentially processed in the case where, e.g., the comparison between the job information of the shortage job and the job information of the job which comes just before the shortage job clarifies that the respective printing conditions thereof are coincide with each other and are special. A specific example of such a special printing condition is that the print processing is carried out with the use of a sheet stored in a rarely used sheet tray; or the like.

Further, when judging that the shortage job and the job which comes just before the shortage job need to be sequentially print-processed, no print processing is carried out with respect to succeeding job coming after the shortage job. In other words, control is carried out such that the shortage job is never skipped and no print processing is carried out with respect to each the succeeding jobs coming after the shortage job. As such, the structure above never carries out the print processing with respect to the succeeding job until completion of the print processing of the shortage job. This makes it possible to prevent an irrelevant job from being outputted between the shortage job and the job which comes just before the shortage job, the jobs being correlated with each other. Accordingly, the shortage job and the job which comes just before the shortage job can be sequentially print-processed.

Further, by using the job information of the job which comes just before the shortage job and the job information of the shortage job, the judgment is made whether or not the shortage job and the job which comes just before the shortage job are to be sequentially outputted. Moreover, the print processing is carried out in accordance with the judgment result. With this, the user is not required to give priority to each of the jobs, unlike in the conventional techniques. Accordingly, the structure above makes it possible to provide a printing apparatus whose usability is further improved as compared with the conventional techniques when carrying out the pass-over processing.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2 is a table illustrating one example of job information stored in an information storing section.

FIG. 3(a), FIG. 3(b), FIG. 3(c), and FIG. 3(d) are diagrams each illustrating a method of carrying out pass-over processing in accordance with correlation among a processed job and unprocessed/being-processed jobs.

FIG. 4(a) is an explanatory diagram illustrating a case where a shortage job is print-processed after completion of ongoing print processing of a job, which ongoing print processing is being carried out as a result of the pass-over processing. FIG. 4(b) is an explanatory diagram illustrating a case where the ongoing print processing of the job is suspended for the sake of carrying out the print processing of the shortage job, which ongoing print processing is being carried out as a result of the pass-over processing.

DESCRIPTION OF THE EMBODIMENTS

One embodiment of the present invention will be described below. That is, a printing apparatus according to the present invention is a printing apparatus for carrying out image forming (hereinafter, referred to as "printing") in order of received jobs. When carrying out pass-over processing in response to error occurrence, the printing apparatus makes a comparison between (i) a current job suspended by the error and (ii) a job (hereinafter, referred to as "proximate job") coming just before the current job so as to judge whether or not the jobs need to be sequentially print-processed (processed). In cases where the jobs need to be sequentially print-processed, the printing apparatus never carries out the pass-over processing. Note that, explanation below assumes that judgment whether or not the proximate job and a shortage job are correlated with each other corresponds to judgment whether or not the jobs need to be sequentially processed.

Note also that, the explanation below exemplifies, as the printing apparatus, a digital multifunctional apparatus having an image forming function; however, the present invention is not limited to this. The other examples of the printing apparatus include: a copying machine, a FAX (facsimile), a printer (inkjet printer and laser printer), etc., each of which is able to sequentially process a plurality of jobs.

Figure 1:
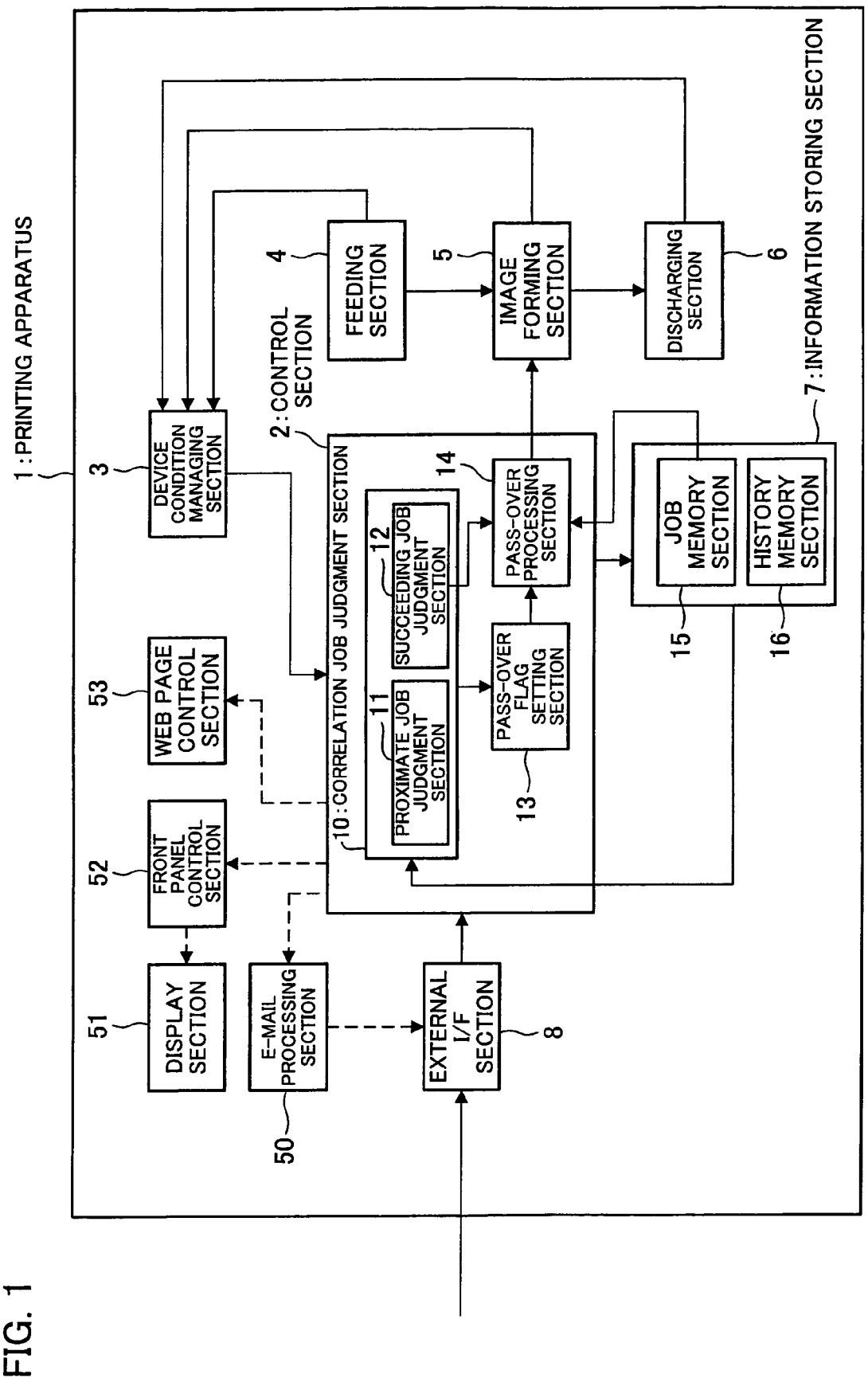
FIG. 1 is a functional block diagram schematically illustrating a structure of a printing apparatus according to the present invention.

FIG. 1 is a functional block diagram schematically illustrating a printing apparatus 1 according to the present embodiment.

As shown in FIG. 1, the printing apparatus 1 according to the present embodiment includes: a control section 2, a device condition managing section (detection means) 3, a feeding section 4, an image forming section (job processing section) 5, a discharging section 6, an information storing section 7, and an external I/F section 8. Moreover, as required, the printing apparatus 1 may include: an e-mail processing section 50, a front panel control section 52, a display section 51, and a web page control section 53.

The device condition managing section 3 monitors respective conditions of the components that are provided with the printing apparatus 1, and that are required for print processing of the jobs. Specific examples of such components include: the feeding section 4, the image forming section 5, the discharging section 6, and the like. When a condition of each of the components has become unusual, the device managing section 3 notifies a correlation job judgment section 10 that the component is in the unusual condition. Moreover, the device managing section 3 may notify the unusual condition to the front panel control section 52. In the case where the device managing section 3 notifies the unusual condition to the front panel control section 52, the front panel control section 52 causes a display section 51 to display the notified unusual condition.

The feeding section 4, the image forming section 5, and the discharging section 6 are the components required for the print processing of each of the jobs. The feeding section 4 stores sheets necessary for the print processing of the jobs. Note that, it is more preferable that the feeding section 4 include a plurality of feeding trays for storing sheets having different sizes (standards).

The image forming section 5 forms an image on a sheet supplied from the feeding section 4. Specifically, the image forming section 5 forms an image on the sheet in accordance with a job transmitted from outside or inside of the apparatus.

The discharging section 6 discharges, to outside, the sheet having the image formed by the image forming section 5. Specifically, the discharging section 6 includes a discharging tray, and discharges the printed sheet to the discharging tray.

The information storing section 7 stores various kinds of information necessary for the printing apparatus 1. The information storing section 7 includes a job memory section 15, and a history memory section (history memory means) 16. The job memory section 15 stores jobs to be print-processed. The job memory section 15 stores the jobs in the order in which the jobs were transmitted, i.e., in which the job memory section 15 received the jobs. In other words, the job memory section 15 stores a plurality of jobs each having date-time information. The date-time information may be given to each of the jobs by the job memory section 15 at the moment of, e.g., storing the job therein. Alternatively, upon the print processing, the date-time information may be given to the job by an apparatus having produced the job. The jobs are print-processed by the printing apparatus 1 from the one having the earliest date-time information.

The history memory section 16 stores job information of the most recent one of the jobs having been subjected to the image forming (print processing). In other words, job information of a job having been print-processed is stored in the history memory section 16. When the history memory section 16 stores new job information, the stored job information is deleted. That is, the history memory section 16 stores at least the newest job information of the respective job information of the jobs having been print-processed, i.e., stores at least job information of a job coming just before a job that is being print-processed. Note that the history memory section 16 may store a plurality of job information items of the jobs having been print-processed.

Note that the job information stored by the history memory section 16 may encompass the job or only information about the job.

The external I/F section 8 receives jobs transmitted from outside. The external I/F section 8 receives each of the jobs transmitted from outside, and transmits the received job to the control section 2. Thereafter, the job thus transmitted is stored by the job memory section 15 of the information storing section 7. On this occasion, the jobs are so stored in the job memory section 15 as to be in receipt order. The order of the stored jobs corresponds to order of print-processing the jobs in normal print processing. Note that the print processing order is changed by the pass-over processing section 14 in cases where the pass-over processing is carried out. Details of this will be explained later.

Further, the external I/F section 8 transmits and receives information via a network outside the printing apparatus 1. Further, the e-mail processing section 50 creates e-mail that is to be transmitted to outside of the printing apparatus 1. Specifically, the e-mail processing section 50 creates e-mail in accordance with (i) information transmitted from the control section 2 and (ii) a specific address such that the e-mail is transmitted to the specific address. The e-mail thus created is transmitted via the external I/F section 8.

The front panel control section 52 controls information that is to be displayed on the display section 51. The display section 51 displays the information. The web page control section 53 creates, e.g., information for displaying, in an external web page, information about a condition of the printing apparatus 1.

Here, the following fully explains the control section 2 according to the present embodiment.

The control section 2 carries out overall control over the printing apparatus 1. What the control section 2 especially controls is the pass-over processing in the print processing. The control section 2 includes: the correlation job judgment section 10, a pass-over flag setting section (flag setting means) 13, and a pass-over processing section 14.

The correlation job judgment section 10 judges whether or not there is any correlation between (i) the job stored in the job memory section 15 or the job information stored in the history memory section 16, and (ii) the job (hereinafter, referred to as "shortage job") that is with regard to occurrence of a print source shortage. Specifically, the correlation job judgment section 10 includes a proximate job judgment section (judgment means) 11 and a succeeding job judgment section (correlation judgment means) 12.

The proximate job judgment section 11 judges correlation between the shortage job and a job (hereinafter, referred to as "proximate job") that has been print-processed just before the shortage job, and that is stored in the history memory section 16. More specifically, the proximate job judgment section 11 makes a comparison between (i) job information about the shortage job, and (ii) job information about the proximate job so as to judge whether or not the jobs are correlated with each other.

Meanwhile, the succeeding job judgment section 12 judges correlation between the shortage job and a job (hereinafter, referred to as "succeeding job") that is so stored in the job memory section 15 as to come after the shortage job. More specifically, the succeeding job judgment section 12 makes a comparison between (i) the job information about the shortage job, and (ii) job information about the succeeding job so as to judge whether or not the jobs are correlated with each other.

Note that each of the jobs includes the job information. Specifically, the job includes: (i) image data to be print-processed, (ii) a processing condition on the print processing, and (iii) the job information such as information for identifying the image data. Moreover, the job information at least includes identification information for identifying (i) the print process condition of the job and/or (ii) the job.

FIG. 2 is a table illustrating one example of the job information stored in the information storing section 7. The following explains details of the job information.

See FIG. 2. The job information include: job pass-over designation, a job classification, an IP (Internet Protocol) address, a copy number, a printing direction, a sheet size, a sheet type, feeding tray information, discharging tray information, both-side print information, staple information, punch information, a user name, and the like. The job including such job information is stored in the job memory section 15.

The job pass-over designation is information given to the job in cases where the image forming apparatus or the apparatus producing the job determines in advance whether or not the job can be passed over.

The job classification indicates job types. Specific examples of the job classification include: (i) a name of application from which the job was produced; (ii) a group name given to the job by the apparatus having produced the job; and the like.

The IP address is a unique address of the apparatus (the apparatus producing the job) that transmitted the job. The IP address specifies the addresser of the job.

The printing direction is information about format of document printed as a result of processing the job. Specifically, the printing direction includes information indicating whether the printing is carried out in a landscape manner or a portrait manner.

The copy number indicates the number of copies printed as a result of processing the job. The sheet size indicates a size of a sheet used upon the print processing of the job. The sheet type is information used in cases where e.g., a special sheet such as colored paper or an OHP (overhead projector) sheet is used upon the print processing of the job.

The feeding tray information is information about each feeding tray storing the sheets which are a source required for the print processing of the job. Specifically, the feeding tray information specifies a feeding tray, which feeds a sheet when the job is print-processed. The discharging tray information specifies a discharge tray, which discharges the sheet after the print-processing of the job. Note that, in cases where the printing apparatus 1 includes a single feeding tray and a single discharging tray, such feeding tray information and such discharging tray information are possibly not included in the job information.

The both-side print information indicates whether or not both-side printing is carried out for the job that is to be print-processed. The staple information is information whether or not staple processing is carried out with respect to output sheet after the print processing of the job. The punch information is information whether or not punching processing is carried out with respect to the output sheet.

The user name is a name of a user who produced the job.

Of these job information items, the job information for judging the correlation is at least any one of the IP address, the job classification, the job pass-over designation, the user name, the sheet size, the sheet type, the feeding tray information, the discharging tray information, and the like. Moreover, it is preferable that the judgment be carried out by using the IP address, the user name, and/or the job classification of the exemplified job information items. Further, only one information item of the above-exemplified job information items may be used for the correlation judgment, or a plurality of information items of the above-exemplified job information items may be used for the correlation judgment.

In the above explanation, the job information includes information irrelevant to the correlation judgment; however, in the present embodiment, the job information may include only information allowing the judgment of the correlation with the shortage job. In other words, the job information at least includes information for judging the correlation with the shortage job.

Note that the items (conditions) for judging the correlation are not limited to the above examples, and the correlation judgment may be carried out in accordance with an interval between a receipt of the proximate job and a receipt of the shortage job. Note also that the history memory section 16 may store, e.g., the job including the aforementioned job information, or merely the job information.

Here, the following explains a way of carrying out the pass-over processing in accordance with the judgment of the correlation with the shortage job. Note that the explanation below assumes that the IP address is used for the judgment whether or not the pass-over processing is to be carried out; however, the IP address is not the only one condition for the judgment whether or not the pass-over processing is to be carried out.

FIG. 3 are diagrams respectively illustrating a way of carrying out the pass-over processing in accordance with correlation among a processed job and unprocessed/being-processed jobs. Note that, for ease of explanation below, jobs are numbered based on the order in which the jobs are stored in the information storing section 7. Specifically, a job 0 indicates the oldest one of the jobs stored in the information storing section 7.

Explained here is processing in cases where sheets are run out during print processing of a job. See FIG. 3(a). The job 0 is a job transmitted from an IP address A, and has already been processed. Each of jobs 1 to 4 is waiting or is being processed. The job 0 having been processed is stored in the history memory section 16. On this occasion, the history memory section 16 may store merely job information, or the job including the job information.

As shown in FIG. 3(a), when the device condition managing section 3 detects a sheet shortage in the middle of the ongoing print processing of the job 1, the proximate job judgment section 11 regards, as the shortage job, the job 1 that caused the sheet shortage. Then, the proximate job judgment section 11 makes a comparison between the job information of the shortage job and the job information of the proximate job (the job 0 in this case), the job information of the proximate job being stored in the history memory section 16. In other words, when the device condition managing section 3 detects error occurrence during the print processing of the job, the proximate job judgment section 11 makes a comparison between (i) the job information of the oldest job (shortage job) of the jobs stored in the job memory section 15, and (ii) the job information stored in the history memory section 16. Specifically, the proximate job judgment section 11 makes a comparison between the respective IP addresses (job information) from which the proximate job and the shortage job came. In the case where the proximate job judgment section 11 judged that the jobs came from the same IP address, i.e., that the jobs are correlated, the proximate job judgment section 11 turns off (carries out no flagging) a flag set in the pass-over flag setting section 13. On the contrary, the proximate job judgment section 11 turns on (carries out flagging) the flag set in the pass-over flag setting section 13 in the case where the proximate job judgment section 11 judged, in accordance with the IP address comparison, that the proximate job and the shortage job are not correlated with each other.

In accordance with the flag set in the pass-over flag setting section 13, the pass-over processing section 14 carries out the pass-over processing. In other words, when detecting that the flag is off in the pass-over flag setting section 13, the pass-over processing section 14 carries out no pass-over processing. In contrast, the pass-over processing section 14 carries out the pass-over processing when detecting that the flag is on (flagging was done) in the pass-over flag setting section 13. Specifically, when detecting that the flag is on, the pass-over processing section 14 causes the image forming section 5 to carry out the print processing with respect to the job.

Specifically speaking, in FIG. 3(a), the pass-over processing section 14 detects that the flag is off in the pass-over flag setting section 13, so that no pass-over processing is carried out. Accordingly, the ongoing print processing of the job 1 coming after the processed job 0 is suspended after printing out first and second pages (see "PRINTING DONE" in FIG. 3(a)). In other words, in the case where the proximate job and the shortage job are correlated with each other, no print processing is carried out with respect to each of the jobs coming after the shortage job. The print processing is suspended until supply of sheets necessary for the printing processing of the shortage job. Once such sheets are supplied, remaining pages are printed by resuming the print-processing of the shortage job. Thereafter, the print processing is carried out with respect to each of the waiting jobs. Note that the control section 2 transfers each of the processed jobs from the job memory section 15 to the history memory section 16. Upon the storing of the new job (job information) in the history memory section 16, the history memory section 16 may delete the old job information stored therein.

FIG. 3(b) is an explanatory diagram illustrating the judgment whether or not the job 1 can be print-processed after the print processing of the job 0. This is especially effective in cases where, e.g., a special sheet is required for the print processing of the job 1.

See FIG. 3(b). Upon the completion of print-processing the job 0, the device condition managing section 3 judges whether or not there are sheets necessary for the print processing of the job 1. In the case where the device condition managing section 3 judges that there are not sheets necessary for the print processing of the job 1, the device condition managing section 3 notifies the judgment to the correlation job judgment section 10. Upon the receipt of the judgment that there are not sheets necessary for the print processing of the job 1, the proximate job judgment section 11 of the correlation job judgment section 10 regards the job 1 as the shortage job, and judges the correlation between the shortage job and the job 0 coming just before the shortage job, in accordance with the respective IP addresses from which the jobs came. In the case shown in FIG. 3(b), the jobs came from the same IP address, so that the proximate job judgment section 11 judges that the jobs are correlated with each other, and therefore turns off the flag in the pass-over flag setting section 13. Detecting the turning-off of the flag in the pass-over flag setting section 13, the pass-over processing section 14 does not carry out the pass-over processing. Namely, in the case shown in FIG. 3(b), after the completion of the print processing of the job 0, the jobs are not print-processed until the supply of the sheets necessary for the print processing of the job 1.

Explained next is a case where the proximate job and the shortage job came from different IP addresses, with reference to FIG. 3(c).

See FIG. 3(c). An IP address A is the IP address of the addresser of the processed job 0 stored in the history memory section 16, whereas an IP address B is the IP address of the addresser of the unprocessed job 1, which is the oldest one of the jobs stored in the job memory section 15. As such, the job 0 and job 1 came from different IP addresses.

In cases where the device condition managing section 3 judges, between the completion of the print processing of the job 0 and the start of the print processing of the job 1, that there are not sheets necessary for the print processing of the job 1, the proximate job judgment section 11 regards the job 1 as the shortage job. Then, the proximate job judgment section 11 judges the correlation between the shortage job and the job 0 coming just before the shortage job, in accordance with the IP addresses from which the jobs came. In the case where the proximate job judgment section 11 judges that the jobs came from the different IP address, i.e., that the jobs are not correlated with each other, the proximate job judgment section 11 turns on the flag in the pass-over flag setting section 13. Detecting the turning-on of the flag in the pass-over flag setting section 13, the pass-over processing section 14 skips (passes over) the print processing of the job 1, and carries out the print processing with respect to each of (i) the job 2 coming after the job 1, and (ii) the jobs coming after the job 2. With this, the job 1 is skipped, and the job 2 is print-processed just after the job 0.

Explained next is the pass-over processing (processing of skipping a job such that the print processing is carried out with respect to each of jobs coming after the job) carried out, in accordance with correlation between the shortage job and the succeeding job, in cases where the proximate job and the shortage job are not correlated with each other. The explanation will be made with reference to FIG. 3(d).

See FIG. 3(d). When the device condition managing section 3 judges that there are not sheets necessary for the print processing of the job 1, the proximate job judgment section 11 makes a comparison between (i) the IP address of the addresser of the job 0 serving as the proximate job, and (ii) the IP address of the addresser of the job 1 serving as the shortage job. In cases where the proximate job judgment section 11 judges that the two IP addresses are different, the proximate job judgment section 11 turns on the flag in the pass-over flag setting section 13, and notifies the succeeding job judgment section 12 that the IP addresses are different. When receiving, from the job judgment section 11, the judgment that the IP addresses are different, the succeeding job judgment section 12 makes a comparison between (i) the IP address of the addresser of the job 1 serving as the shortage address, and (ii) each IP address of the addressers of the succeeding jobs (the job 2 to the job 6) coming after the job 1.

More specifically, the succeeding job judgment section 12 makes a comparison between (i) the IP address of the addresser of the job 1, and (ii) an IP address of the addresser of the most immediate job 2 with respect to the job 1. In cases where the succeeding job judgment section 12 judges that the IP addresses are the same, the succeeding job judgment section 12 makes a comparison between (i) the IP address of the addresser of the job 1, and (ii) an IP address of the addresser of the job 3 coming just after the job 2. As such, in the order from the most immediate succeeding job with respect to the shortage job, the succeeding job judgment section 12 sequentially carries out the judgment whether or not each of the succeeding jobs is correlated with the shortage job. The succeeding job judgment section 12 keeps on making such an IP address comparison until the succeeding job judgment section 12 finds a succeeding job that is not correlated with the shortage job, i.e., that came from an IP address different from the IP address from which the shortage job came. The succeeding job judgment section 12 notifies the pass-over processing section 14 that the print processing should be passed over to the job (the job 4 in this case) that was so judged as to have no correlation with the shortage job.

The pass-over processing section 14 carries out the pass-over processing when the flag is on in the pass-over flag setting section 13, in response to the receipt of the judgment indicating which one is the job to which the print processing should be passed over. The pass-over processing section 14 is carried out such that the shortage job is skipped and the print processing is carried out with respect to (i) the job judged as the job to which the print processing should be passed over, and (ii) each of the jobs coming after the job thus judged. Specifically, as shown in FIG. 3(d), the succeeding job judgment section 12 judges that the job 1 serving as the shortage job, the job 2, and the job 3 came from the same IP address, and regards the job 4 as the job to which the print processing should be passed over. With this, after the completion of the print processing of the job 0, the jobs 1 to 3 are skipped, and the job 4 and the jobs coming after the job 4 are sequentially print-processed.

As such, when the proximate job judgment section 11 judges that the shortage job and the proximate job are correlated (came from the same IP address in this case) with each other, the pass-over processing section 14 carries out no pass-over processing, and waits (stands by) until the supply of the source (sheets in this case) necessary for the printing corresponding to the shortage job.

Explained next is a case where the shortage job becomes processible by supplying, during the print processing of the succeeding job coming after the shortage job, the source necessary for the print processing of the shortage job. The explanation will be made with reference to FIG. 4.

FIG. 4(a) is an explanatory diagram illustrating a case where the print processing of the shortage job is carried out after the completion of the ongoing print processing of the job, the ongoing processing being carried out as a result of the pass-over processing.

See FIG. 4(a). When the device condition managing section 3 judges that there are not sheets necessary for the print processing of the job 1, the proximate job judgment section 11 makes a judgment of the correlation between the proximate job (job 0) and the shortage job (job 1). The judgment criterion is whether or not the jobs came from the same IP address. In cases where the proximate job judgment section 11 judges that there is no correlation between the proximate job and the shortage job, the pass-over processing section 14 skips the shortage job, and print-processes a succeeding job coming after the shortage job.

In cases where the device condition managing section 3 detects the supply of the source (sheets in this case) necessary for the print processing of the shortage job while the print processing is carried out with respect to the succeeding job (the job 4 in this case) after passing over the shortage job, the device condition managing section 3 notifies the correlation job judgment section 10 that the shortage job has become processible. Upon the receipt of the notification, the correlation job judgment section 10 turns off the flag set in the pass-over flag setting section 13. At the moment of the completion of the print processing of the succeeding job (the job 4), the pass-over processing section 14 detects that the flag is off in the pass-over flag setting section 13, and carries out the print processing with respect to the job 1 serving as the shortage job. Thereafter, the print processing is carried out with respect to each of the jobs in order in which the jobs are stored in the job memory section 15. In this case, as shown in FIG. 4(a), the job 0 is print-processed, and then the job 4 is print-processed, and then the job 1 is print-processed, and then each of the jobs after the job 1 is print-processed. The job 5 is print-processed after the job 3 because the job 4 has already been print-processed.

FIG. 4(b) is an explanatory diagram illustrating a case where the ongoing print-processing of the job is suspended for sake of carrying out the print-processing of the shortage job, the ongoing print processing being carried out as a result of the pass-over processing. The operation illustrated in FIG. 4(b) is different from the operation illustrated in FIG. 4(a) as follows. That is, when the device condition managing section 3 notifies the correlation job judgment section 10 that the shortage job has become processible, the correlation job judgment section 10 turns off the flag in the pass-over flag setting section 13, and notifies the pass-over processing section 14 that the shortage job has become processible. Upon the receipt of the notification from the correlation job judgment section 10, the pass-over processing section 14 immediately suspends the ongoing print processing of the succeeding job (job 4), which ongoing print processing is being carried out after passing over the shortage job. Then, the pass-over processing section 14 starts the print processing of the job 1 serving as the shortage job. When completing the print processing of the job 1, and of the jobs 2 and 3 each correlated with the job 1, the pass-over processing section 14 resumes the suspended print processing of the job 4. Therefore, the print processing is carried out such that: the job 0 is print-processed, and then a part of the job 4 is print-processed, and then each of the jobs 1 to 3 is print-processed, and finally the rest of the job 4 is print-processed. As such, the print-processing of the shortage job (job 1) is preceded by suspending the ongoing print-processing caused to be carried out as a result of the pass-over processing, i.e., the ongoing print processing of the job 4. Such a way of print-processing is effective in cases where, e.g., the shortage job is a very urgent job that needs to be immediately print-processed.

Figure 5:
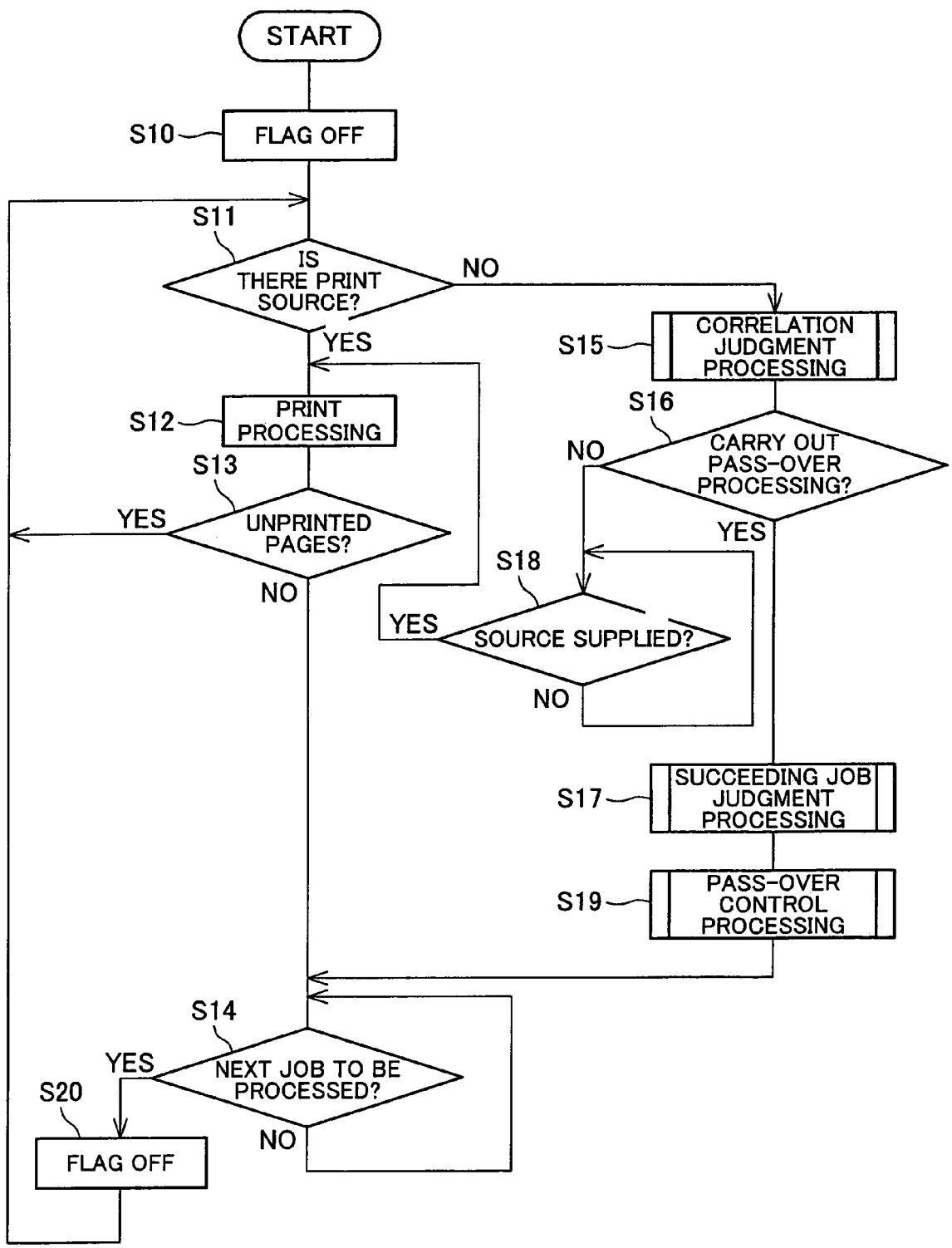
FIG. 5 is a flowchart illustrating a printing method according to the present embodiment.

Here, the following explains the printing method according to the present embodiment, with reference to a flowchart of FIG. 5.

Firstly, when the printing apparatus 1 is powered on, the flag in the job pass-over setting section is turned off (S10). When jobs to be processed are transmitted from outside, the job memory section 15 stores the jobs. The jobs thus stored will be sequentially print-processed.

On this occasion, the device condition managing section 3 judges whether or not each of the jobs is processible, i.e., whether or not there are sources necessary for the print processing of the job (S11). Examples of the source include a sheet, toner, and the like.

In the case where the device condition managing section 3 judges in the step S11 that there are sources necessary for the print processing, the control section 2 causes the image forming section 5 to print-process the job (S12). Then, the control section 2 judges whether or not there are any unprinted pages for the job (S13). In cases where there are such unprinted pages, the sequence goes back to S11.

On the other hand, in cases where the control section 2 judges that there is no unprinted page, the control section 2 judges whether or not there is a next unprocessed job (S14), in reference to the job memory section 15. In cases where the control section 2 judges that there is such a next unprocessed job, the control section 2 turns off the flag of the pass-over flag setting section 13 for the sake of print-processing the next job by operating the image forming section 5 (S20), and the sequence goes to S11.

In the case where the control section 2 judges in the step S11 that there is no source for the print processing, the proximate job judgment section 11 of the correlation job judgment section 10 carries out correlation judgment processing (S15). The correlation judgment processing is processing for judging the correlation between the proximate job and the shortage job, and for judging whether or not the flagging is to be carried out in the pass-over flag setting section 13. Details of the correlation judgment processing will be described later.

After the correlation judgment processing in the step S15, the pass-over processing section 14 detects the state of the flag so as to judge whether or not the pass-over processing is to be carried out (S16).

In the case where the pass-over processing section 14 judges in the step S16 that the pass-over processing is to be carried out, i.e., in the case where the flag was turned on in the pass-over flag setting section 13 in the step S15, the succeeding job judgment section 12 carries out succeeding job judgment processing (S17) so as to determine a job to which the print processing is to be passed over. After the determination of the job (next job) to which the print processing is to be passed over, the succeeding job judgment section 12 carries out pass-over control processing (S19). Then, the sequence goes to the step S14. Note that the pass-over control processing will be described later.

On the other hand, in the case where the pass-over processing section 14 judges in the step S16 that the pass-over processing is not to be carried out, i.e., where the flag was turned off in the pass-over flag setting section 13 in the step S15, no pass-over processing is carried out, so that the image forming section 5 does not carry out the print processing but waits (stands by). The control section 2 judges whether or not the control section 2 has received any notification that the source was supplied for the print processing of the job, which causes the source shortage when being print-processed (S18). Once the source is supplied, the sequence goes to the step S12.

Figure 6:
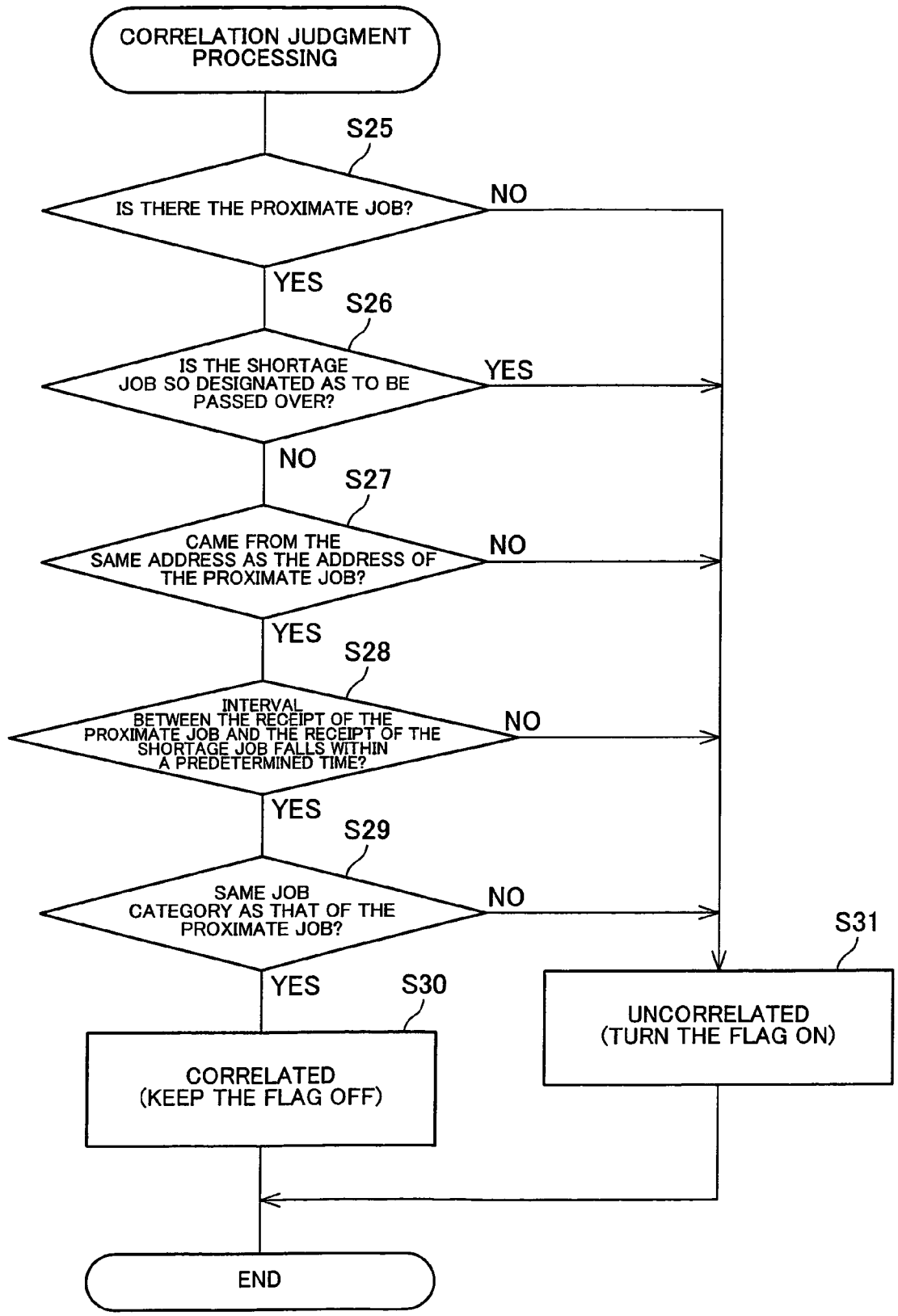
FIG. 6 is a flowchart illustrating a flow of correlation judgment processing.

FIG. 6 is a flowchart illustrating a flow of the correlation judgment processing. The following explains the correlation judgment processing. Note that the explanation below deals with an example in which the correlation between the shortage job and the proximate job is judged in accordance with the following four conditions (see FIG. 2): (i) the job pass-over designation, (ii) the job classification, (iii) the IP address, and (iv) the interval between the receipt of the proximate job and the receipt of the shortage job.

Firstly, the proximate job judgment section 11 judges whether or not there is the proximate job (S25). Specifically, the proximate job judgment section 11 judges whether or not the job information is stored in the history memory section 16. In cases where a plurality of the job information items are stored in the history memory section 16, the proximate job judgment section 11 regards, as the proximate job, a job stored most recently, and makes the following judgment. On the other hand, in cases where a single job information item is stored in the history memory section 16, the proximate job judgment section 11 judges the job as the proximate job, and makes the following judgment.

In the case where the proximate job judgment section 11 judges in the step S25 that there is the proximate job, the proximate job judgment section 11 judges, in reference to the job information of the shortage job, whether or not the shortage job is so designated as to be passed over (S26). Next, in the case where the proximate job judgment section 11 judges in the step S26 that the shortage job is not so designated as to be passed over, the proximate job judgment section 11 makes a comparison between the job information of the shortage job and the job information of the proximate job so as to judge whether or not the jobs came from the same IP address (S27).

Further, in the case where the proximate job judgment section 11 judges in the step S27 that the jobs came from the same IP address, the proximate job judgment section 11 makes reference to time when the jobs were received by the information storing section 7 of the printing apparatus 1, so as to judge whether or not the interval between the respective receipts of the jobs falls within a predetermined time (S28). The predetermined time may be set arbitrarily.

In the case where the proximate job judgment section 11 judges in the step S28 that the interval between the respective receipts of the jobs falls within the predetermined time, the proximate job judgment section 11 judges whether or not the proximate job and the shortage job fall within the same job classification, in reference to the respective job information of the proximate job and the shortage job (S29).

Further, in cases where the proximate job judgment section 11 judges in the step S29 that the jobs fall within the same job classification, the proximate job judgment section 11 judges that the proximate job and the shortage job are correlated with each other, and keeps (does not change) the flag of the pass-over flag setting section 13 (S30) off. Then, the correlation judgment processing is terminated.

Meanwhile, in the following cases (1) to (5), the proximate job judgment section 11 judges that the proximate job and the shortage job are not correlated with each other, and turns on the flag of the pass-over flag setting section 13 for the sake of the pass-over processing (S31): (1) the proximate job judgment section 11 judges in the step S25 that there is no proximate job; (2) the proximate job judgment section 11 judges in the step S26 that the shortage job is not so designated as to be passed over; (3) the proximate job judgment section 11 judged in the step S27 that the jobs were not transmitted from the same address; (4) the proximate job judgment section 11 judged in the step S28 that the interval between the respective receipts of the jobs did not fall within the predetermined time; and (5) the proximate job judgment section 11 judged in the step 29 that the jobs did not fall within the same job classification. Thereafter, the correlation judgment processing is terminated.

Thereafter, in the step S16, the judgment is made whether or not the pass-over processing is to be carried out, in accordance with the state of the flag of the pass-over flag setting section 13.

In this way, whether or not the pass-over processing is to be carried out is determined in accordance with the respective job information of the proximate job and the shortage job.

Figure 7:
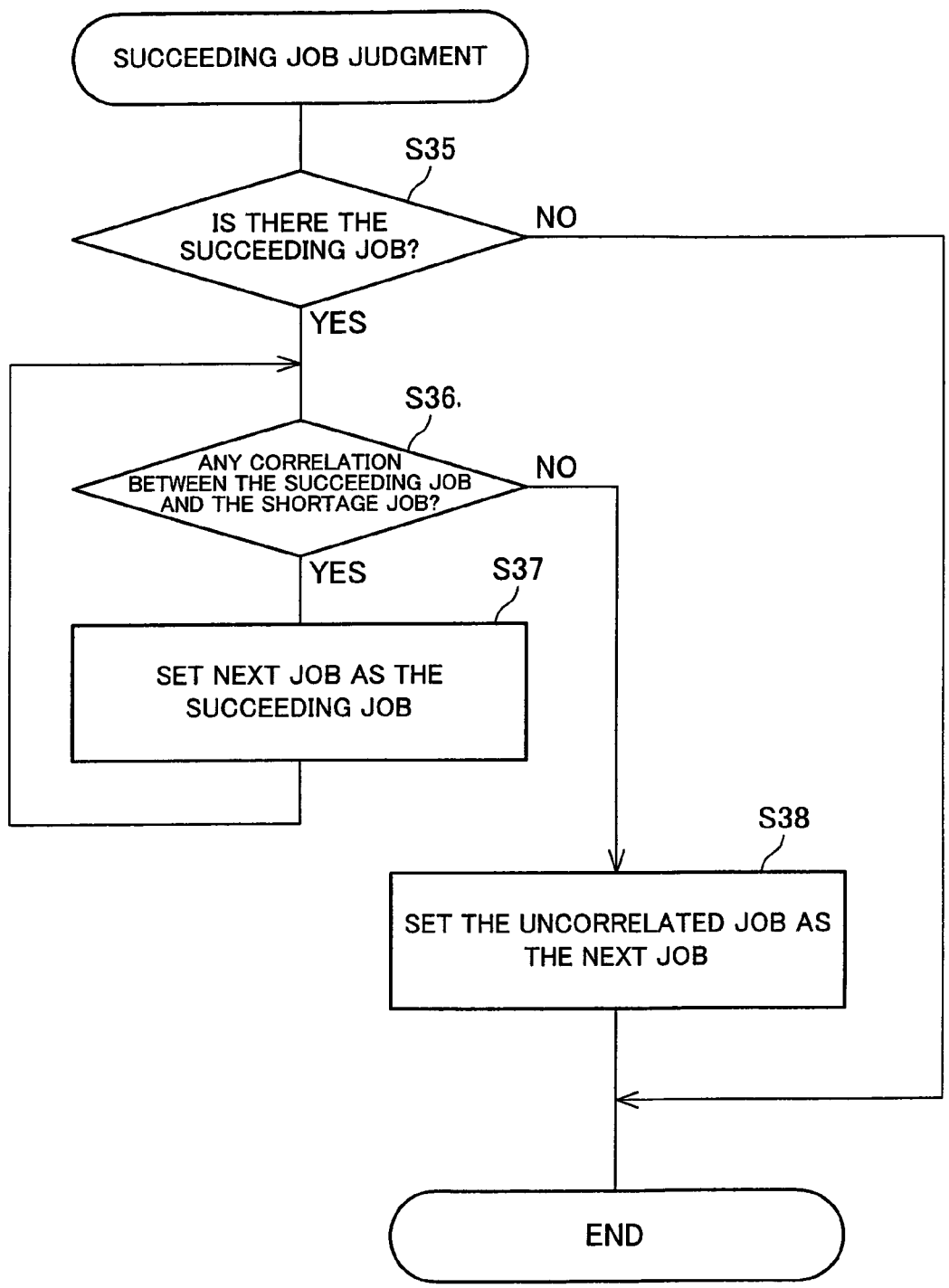
FIG. 7 is a flowchart illustrating succeeding job judgment processing.

FIG. 7 is a flowchart illustrating the succeeding job judgment processing. The following explains the succeeding job judgment processing.

Firstly, the succeeding job judgment section 12 judges whether or not there is a succeeding job (S35). Specifically, the succeeding job judgment section 12 makes reference to the job memory section 15 so as to judge whether or not there is a job (succeeding job) that is so stored as to come after the shortage job. In cases where the succeeding job judgment section 12 judges that there is no succeeding job, the succeeding job judgment processing is terminated.

In the case where the succeeding job judgment section 12 judges in the step S35 that there is the succeeding job, the succeeding job judgment section 12 regards, as the succeeding job, the job coming just after the shortage job in the job memory section 15. Then the succeeding job judgment section 12 judges whether or not the shortage job and the succeeding job are correlated with each other (S36). Note that, as is the case with the correlation judgment processing explained above, the judgment of the correlation can be made by, e.g., comparing the respective IP addresses from which the jobs were transmitted. For this reason, detailed explanation thereof is omitted here.

In the case where the succeeding job judgment section 12 judges in the step S36 that the shortage job and the succeeding job are correlated with each other, the succeeding job judgment section 12 newly sets, as the succeeding job, a job coming just after the foregoing succeeding job (S37). Then, the sequence goes to the step S36. In other words, by way of the processing in the step S36 and the processing in the step S37, the succeeding job judgment section 12 judges which one is the last one of succeeding jobs which are correlated with the shortage job and which come after the shortage job. Meanwhile, in the case where the succeeding job judgment section 12 judges in the step S36 that the shortage job and the succeeding job are not correlated with each other, the succeeding job judgment section 12 regards the uncorrelated job as the job to which the print processing is to be passed over, i.e., as the next job (S38). So, the pass-over processing section 14 controls the image forming section 5 such that the shortage job is passed over and the image forming section 5 carries out the print processing with respect to the job set in the step S38.

Figure 8:
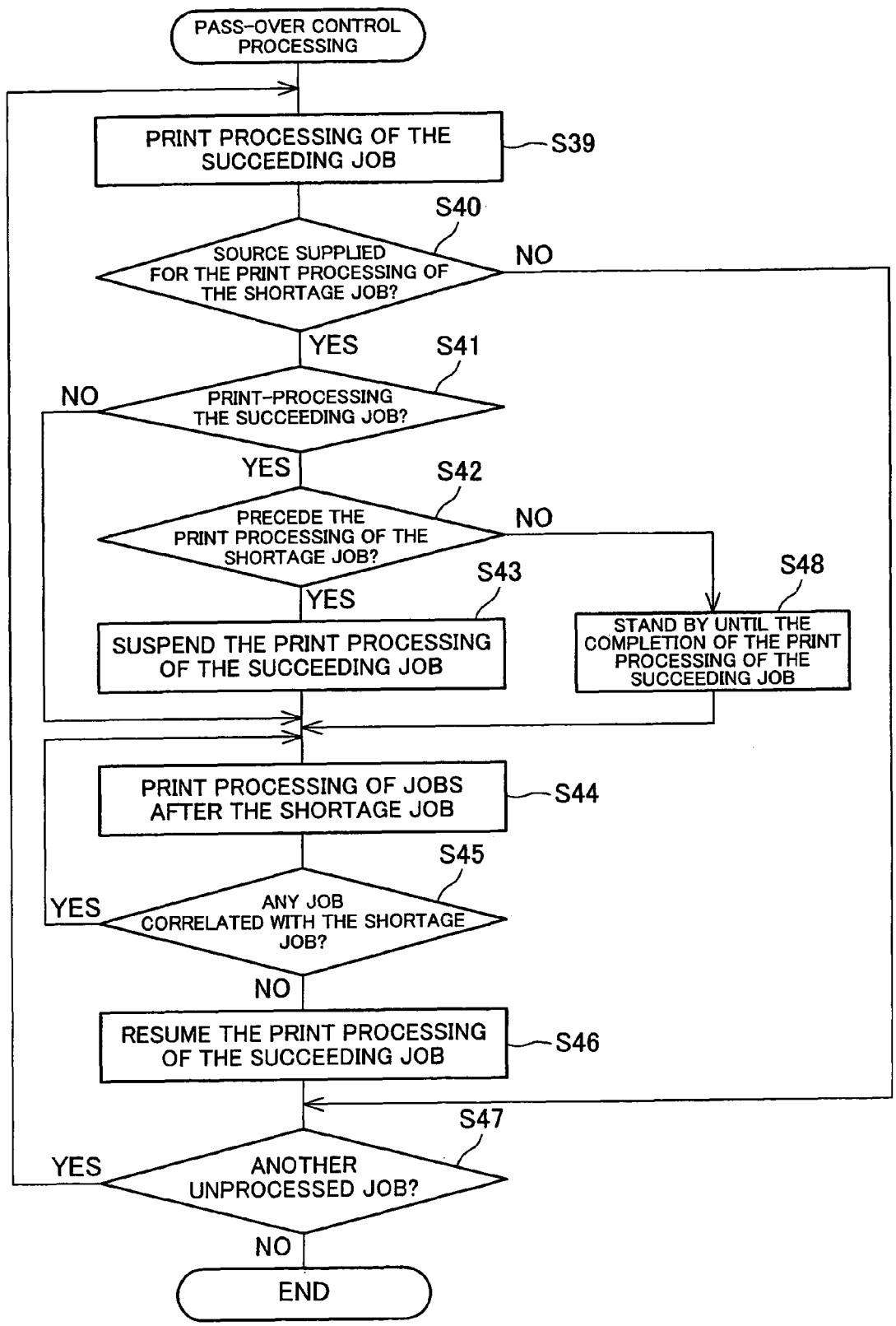
FIG. 8 is a flowchart illustrating (i) a flow of the print processing and (ii) the pass-over processing in cases where a required source is supplied for the print processing of the shortage job during the pass-over processing.

FIG. 8 is a flowchart illustrating (i) the pass-over processing and (ii) a flow of the print processing in the event of supplying, during the pass-over processing, the source necessary for the print processing of the shortage job.

In response to the determination, made in the aforementioned succeeding job judgment processing, of the succeeding job to which the processing is passed over, the succeeding job judgment section 12 notifies the result to the pass-over processing section 14. The pass-over processing section 14 receives the result, and print-processes the determined succeeding job (S39).

While and after the succeeding job is print-processed, the device condition managing section 3 judges whether or not the source necessary for the print processing of the shortage job is supplied (S40).

When detecting the supply of the source for the shortage job in the step S40, the device condition managing section 3 notifies the control section 2 that the source was supplied. Upon the receipt of the notification of the supply, the control section 2 judges whether or not the succeeding job is being processed (S41).

In the case where the control section 2 judges in the step S41 that the succeeding job is being processed, the control section 2 decides that the ongoing print processing of the succeeding job is suspended such that the print processing of the shortage job is to be preceded, or decides that the shortage job is to be print-processed after the completion of the ongoing print processing of the succeeding job (S42). The decision is made in accordance with the predetermined print condition setting.

In the cases where the control section 2 decides in the step S42 that the print processing of the shortage job is to be preceded, the pass-over processing section 14 suspends the operation of the image forming section 5 that is carrying out the print processing with respect to the succeeding job (S43). Then, the pass-over processing section 14 print-processes the shortage job (S44). Next, the pass-over processing section 14 judges whether or not there is the job correlated with the shortage job (S45). Specifically, the pass-over processing section 14 judges whether or not, of the succeeding jobs, there is a job that was so judged as to be correlated with the shortage job in the aforementioned succeeding job judgment processing.

In the case where the pass-over processing section 14 judges in the step S45 that there is a job correlated with the shortage job, the sequence goes back to the step S44 for the purpose of print-processing the job coming before the succeeding job that is being processed after passing over the shortage job.

Upon the completion of print-processing the shortage job and the correlated job, i.e., print-processing the jobs coming before the succeeding job that was partially print-processed after passing over the jobs, the pass-over processing section 14 resumes the print-processing of the succeeding job (S46).

Next, the pass-over processing section 14 judges whether or not there is another succeeding job to be processed (S47). In the case where the pass-over processing section 14 judges that there is the succeeding job to be processed, the sequence goes back to S40. In the case where there is no succeeding job to be processed, the processing is terminated.

Meanwhile, in the case where the control section 2 judges in the step S41 that the succeeding job is not being processed, the sequence goes to S44. Further, in the case where the control section 2 decides in the step S42 that the ongoing print processing of the succeeding job is to be preceded, the pass-over processing section 14 does not carry out the print processing of the shortage job until the completion of the print processing of the succeeding job (S48). Further, in cases where no supply of the source for the shortage job was detected in the step S40, i.e., in cases where no source was supplied in the step S40, the sequence goes to S47.

As described above, a printing apparatus 1 according to the present invention includes (a) an image forming section (job processing means) 5 for carrying out print processing with respect to received jobs; (b) a device condition managing section (detecting means) 3 for detecting whether or not there is a source required for the print processing of each of the jobs; (c) a pass-over processing section (job control means) 14 for managing print processing order of the jobs, and for controlling the image forming section 5 such that a shortage job is skipped and the print processing is carried out with respect to each of succeeding jobs coming after the shortage job in the print processing order, the shortage job being either a job that has order to be next print-processed, or a job that is being print-processed, and the shortage job being a job which is so judged by the device condition managing section 3 as to cause a shortage of the source; and (d) a proximate job judgment section judgment means) 11 for judging whether or not the shortage job and a job which comes just before the shortage job need to be consecutively print-processed, by comparing (i) job information, which is included in the shortage job and which includes at least identification information for identifying (1) a print processing condition of the job and/or (2) the job, with (ii) job information of the job which comes just before the shortage job, in cases where the proximate job judgment section 11 judges that the shortage job and the job which comes just before the shortage job need to be sequentially print-processed, the pass-over processing section 14 controlling the image forming section 5 such that the shortage job, judged to be print-processed in continuity with the job which comes just before the shortage job, is not skipped for print processing with respect to the succeeding jobs coming after the shortage job, until completion of the print processing of the shortage job.

The wording "a job that has order to be next print-processed" refers to a job, to be processed next, of unprocessed jobs. In other words, the wording "a job that has order to be next print-processed" refers to an unprocessed job, having order to be next print-processed, of unprocessed jobs.

Further, the pass-over processing section 14 determines order of printing the received jobs so as to manage the print processing order. Specifically, for example, the pass-over processing section 14 normally determines the print processing order in accordance with the order in which the printing apparatus 1 received the jobs. However, when the sheet shortage causes error during print processing of a job, the pass-over processing section 14 determines the print processing order such that: the job suspended by the error is skipped, and a job coming after the job is print-processed.

Further, the job includes the job information. The job information includes identification information for identifying (i) a print processing condition of the job and/or (ii) the job. Examples of the print processing condition of the job include: the sheet size for the print processing of the job, the copy number, and the like. Examples of the identification information include addresser information indicating a source that transmitted the job; a name of a user who produced the job; and the like.

Normally, in cases where image forming can be carried out with respect to a job coming after a job judged to cause the source shortage when being processed, the job pass-over processing is carried out, and the job coming after is accordingly subjected to the image forming.

According to the above structure, the proximate job judgment section 11 makes a comparison between the job information of the shortage job and the job information of the job which comes just before the shortage job, so as to judge whether or not the shortage job and the job which comes just before the shortage job need to be sequentially processed.

Specifically, the proximate job judgment section 11 judges that the jobs need to be sequentially print-processed in cases where, e.g., the comparison between the job information of the shortage job and the job information of the job which comes just before the shortage job clarifies that the identification information of the shortage job and the identification information of the job which comes just before the shortage job are coincident with each other. Moreover, the proximate job judgment section 11 judges that the jobs need to be sequentially print-processed in cases where, e.g., the comparison between the job information of the shortage job and the job information of the job which comes just before the shortage job clarifies that the respective print processing conditions thereof are coincide with each other and are special. A specific example of such a special processing condition is that print processing is carried out with the use of a sheet stored in a rarely used sheet tray.

In the case where the proximate job judgment section 11 judged that the shortage job and the job which comes just before the shortage job need to be sequentially print-processed, the proximate job judgment section 11 carries out control such that no print processing is carried out with respect to each of the succeeding jobs coming after the shortage job. Therefore, the above structure does not print-process the succeeding job until the completion of the shortage job. This prevents an irrelevant job from being outputted (printed out; processed) between the shortage job and the job coming just before the shortage job, which jobs are correlated with each other.

Further, whether or not the shortage job and the job which comes just before the shortage job should be sequentially outputted is determined in accordance with the job information of the shortage job and the job information of the job which comes just before the shortage job. With this, the user is not required to give priority to the jobs for the sake of the pass-over processing. On this account, such a bothersome priority-giving operation is not required, so that the pass-over processing can be carried out more effectively.

It is more preferable that the printing apparatus 1 according to the present invention further include a history memory section (history memory means) 16 for storing at least part of the job information of the job which comes just before the shortage job.

Normally, print-processed jobs are sequentially deleted. According to the above structure, the printing apparatus 1 includes the history memory section 16 for storing at least a part of the job information of the print-processed job which comes just before the shortage job. This allows storage of the job information of the processed job which comes just before the shortage job. With this, the judgment can be made whether or not the shortage job and the job which comes just before the shortage job are correlated with each other (whether or not the jobs need to be sequentially print-processed). Note that the history memory section 16 may store at least a part of the job information of job which comes just before the shortage job; or may store, e.g., job which comes just before the shortage job; or may store only an information item, which allows the judgment on the correlation with the shortage job, of the job information.

It is more preferable that the printing apparatus 1 according to the present invention further include: a succeeding job judgment section (correlation judgment means) 12 for sequentially judging whether or not the shortage job and its succeeding jobs need to be consecutively print-processed, by comparing (i) the job information of the shortage job with (ii) job information of the succeeding jobs in order in which the succeeding jobs are print-processed, wherein: the pass-over processing section 14 controls the image forming section 5 such that the shortage job is skipped for the print processing with respect to (i) a succeeding job which the correlation judgment section judged that the succeeding job and the shortage job do not need to be consecutively print-processed, and (ii) each of jobs coming after the succeeding job.

According to the above structure, by comparing the job information of the shortage job and the job information of the succeeding job, the judgment is made whether or not the succeeding job and the shortage job need to be sequentially print-processed. Further, the pass-over processing is carried out such that the print processing is sequentially carried out with respect to the succeeding jobs coming after the job that was so judged as not to be sequentially print-processed. In other words, the correlation judgment is carried out with respect to the succeeding jobs in the order from one closest to the shortage job, and no print processing is carried out with respect to succeeding jobs that were so judged as to be sequentially print-processed. As such, no print processing is carried out with respect to each of the succeeding jobs that were so judged as to be sequentially print-processed, so that an irrelevant job is prevented from being outputted among a plurality of jobs that need to be sequentially print-processed.

The printing apparatus 1 according to the present invention is more preferably arranged such that: in cases where the proximate job judgment section 11 judges that the shortage job and the job which comes just before the shortage job do not need to be consecutively print-processed, the pass-over processing section 14 controls the image forming section 5 such that the shortage job is skipped for the print processing with respect to a succeeding job coming after the shortage job.

According to the above structure, when judging that the shortage job and the job which comes just before the shortage job do not need to be sequentially processed, the pass-over processing (such processing that the shortage job is skipped and the job coming after the shortage job is print-processed) is carried out. With this, the succeeding job can be print-processed even in cases where, e.g., the source for the shortage job is not supplied.

The printing apparatus according to the present invention is more preferably arranged such that: in cases where the device condition managing section 3 detects supply of a source required for the print processing of the shortage job, when the shortage job is skipped and the succeeding job is print-processed, the pass-over processing section 14 controls the image forming section 5 such that ongoing print processing of the succeeding job is suspended to carry out print processing of the shortage job.

According to the above structure, the print processing of the succeeding job is suspended, and the print processing of the shortage job is carried out, with the result that the shortage job can be outputted quickly.

The printing apparatus 1 according to the present invention is more preferably arranged such that in cases where the device condition managing section 3 detects supply of a source required for the print processing of the shortage job, when the image forming section 5 skips the shortage job and print-processes the succeeding job, the pass-over processing section 14 controls the image forming section 5 such that the print processing is carried out with respect to the shortage job after completion of ongoing print processing of the succeeding job.

According to the above structure, in cases where the print processing of the succeeding job is being carried out at the moment of detecting the supply of the source for the shortage job that cannot be print-processed due to the source shortage, the print processing of the shortage job is carried out after the completion of the ongoing print processing of the succeeding job. In other words, the shortage job is never print-processed in the middle of the ongoing print processing of the succeeding job. This makes it possible to prevent the print-processing of the shortage job from dividing the print-processing of the succeeding job.

The printing apparatus 1 according to the present invention is more preferably arranged such that the proximate job judgment section 11 judges whether or not the shortage job and the job which comes just before the shortage job need to be consecutively print-processed, in accordance with addresser information about the addresser who transmitted the job which information is included in the job information.

In cases where the shortage job and the job which comes just before the shortage job have the same addresser information, the jobs are highly likely to be correlated with each other. Therefore, in accordance with the addresser information, the judgment is made whether or not the shortage job and the proximate job need to be sequentially print-processed. With this, the jobs need to be sequentially print-processed can be sequentially processed.

The printing apparatus 1 according to the present invention is more preferably arranged such that the proximate job judgment section 11 judges whether or not the shortage job and the job which comes just before the shortage job need to be consecutively print-processed, by comparing (i) job classification included in the job information of the shortage job, with (ii) job classification included in the job information of the job which comes just before the shortage job.

A specific example of the job classification is an extension identifying application having produced the job; or the like. Such job classification is highly likely to indicate whether or not the shortage job and job which comes just before the shortage job are correlated with each other. For this reason, the use of the job classification allows the judgment whether or not the shortage job and the job which comes just before the shortage job need to be sequentially print-processed.

The printing apparatus 1 according to the present invention is more preferably arranged such that the proximate job judgment section 11 section judges whether or not the shortage job and the job which comes just before the shortage job need to be consecutively print-processed, in accordance with an interval between (i) receipt time of the job which comes just before the shortage job and (ii) receipt time of the shortage job.

Even though the shortage job and the job which comes just before the shortage job have, e.g., the same job classification or the same addresser information, the jobs are not possibly correlated with each other in cases where an interval is considerably long between a receipt of the shortage job and a receipt of the job which comes just before the shortage job. For this reason, in accordance with the receipt interval, more precise judgment can be made whether or not the shortage job and the job which comes just before the shortage job are correlated with each other, by judging whether or not the shortage job and the job coming just before the shortage job need to be sequentially print-processed.

The printing apparatus 1 according to the present invention is more preferably arranged such that the pass-over processing section 14 is able to switch between (i) a pass-over limit mode in which the pass-over processing section 14 controls the image forming section 5 such that the print processing of the succeeding jobs is suspended until completion of the print processing of the shortage job in cases where the proximate job judgment section 11 judges that the shortage job and the job which comes just before the shortage job need to be consecutively print-processed, and (ii) a pass-over mode in which the pass-over processing section 14 controls the image forming section 5 such that, irrespective of how the proximate job judgment section 11 judged, the print processing of the shortage job is skipped for the print processing with respect to the succeeding job.

According to the above structure, the pass-over limit mode is especially effective in cases where the shortage job and the job which comes just before the shortage job are to be sequentially print-processed, whereas the pass-over mode is effective in cases where the succeeding job is to be print-processed as quickly as possible.

In the structure, the pass-over limit mode and the pass-over mode are switchable, so that the pass-over processing can be changed according to the user's intention.

The printing apparatus 1 according to the present invention is more preferably arranged such that the image forming section 5 includes a pass-over flag setting section 13 for setting a flag, indicative of whether or not the job which comes just before the shortage job and the shortage job need to be consecutively print-processed, based on how the proximate job judgment section 11 judged, and the pass-over processing section 14 controls the image forming section 5 in response to the flag.

With the above structure, the judgment is made, in accordance with the on/off state of the flag of the pass-over flag setting section 13, whether or not the shortage job and the job which comes just before the shortage job need to be sequentially print-processed. With this, the succeeding job is never print-processed until the completion of the print-processing of the shortage job. This makes it possible to more securely prevent an irrelevant job from being outputted between (i) the job which comes just before the shortage job and (ii) the shortage job, the jobs being correlated with each other.

A printing method for the printing apparatus 1 according to the present invention includes the steps of: (a) carrying out print processing with respect to received jobs; (b) detecting whether or not there is a source required for the print processing of each of the jobs; (c) managing print processing order of the jobs, and controlling the image forming section 5 such that a shortage job is skipped and the print processing is carried out with respect to each of succeeding jobs coming after the shortage job in the print processing order, the shortage job being either a job that has order to be next print-processed, or that is a job that is being print-processed, and the shortage job being a job which is so judged in the step (b) to cause a shortage of the source; and (d) judging whether or not the shortage job and a job which comes just before the shortage job need to be consecutively print-processed, by comparing (i) job information, which is included in the shortage job and which includes at least identification information for identifying (1) a print processing condition of the job and/or (2) the job, with (ii) job information of the job which comes just before the shortage job; in cases where the shortage job and the a job which comes just before the shortage job are so judged in the step (d) that the shortage job and the job which comes just before the shortage job are required to be sequentially print-processed, the image forming section 5 being controlled such that the shortage job, judged to be print-processed in continuity with the job which comes just before the shortage job, is not skipped for print processing with respect to the succeeding job coming after the shortage job, until completion of the print processing of the shortage job.

According to the above structure, when judging that the shortage job and the proximate job need to be sequentially processed, the control is carried out such that no processing is carried out with respect to the succeeding job coming after the shortage job. With this, the succeeding job is never print-processed until the completion of the print processing of the shortage job. This makes it possible to prevent an irrelevant job from being outputted between (i) the job which comes just before the shortage job and (ii) the shortage job, the jobs being correlated with each other.

Note that, the explanation above assumes the structure that deletes the previously stored job information in response to the storing of the new job (job information) in the history memory section 16; however, the present invention is not limited to this. For example, the structure may be arranged such that: new jobs are accumulated in the history memory section 16 without deleting the previously stored job information, and all the accumulated jobs except the newest job (job information) are deleted after a certain period of time passes. In this case, the job (job information) stored the most recently is the job coming just before the shortage job.

Further, the explanation above assumes the sheet as an example of the source required for the print processing of the job; however, the source is not limited to the sheet. Another example of the source is a staple or the like. Further, the shortage of the source required for the print processing of the job encompasses a case where the job cannot be print-processed because, e.g., a sheet cannot be discharged from the discharging tray that is filled with sheets, and that is for use in discharging a sheet printed by print-processing a job.

Note that, each section and each processing step in the printing apparatus 1 according to the above embodiment can be realized by causing calculating means such as a CPU (central processing unit) to execute a program stored in the information storing section 7 such as a ROM (Read Only Memory) or a RAM (Random Access Memory) so that operations of communication means such as an interface circuit are controlled. Therefore, the functions and the processing in the printing apparatus 1 of the present embodiment can be realized merely by causing a computer including the means to read out and execute the program from a recording medium storing the program. Further, the functions and the processing can be realized in an arbitrary computer via a removable recording medium storing the program.

Such a computer program storage medium may be a memory (not shown), such as a ROM, so that the process is executable on a microcomputer. Alternatively, a program medium may be used which can be read by inserting the storage medium in an external storage device (program reader device; not shown).

In addition, in either of the cases, it is preferable if the contained program is accessible to a microprocessor which will execute the program. Further, it is preferable if the program is read, and the program is then downloaded to a program storage area of a microcomputer where the program is executed. Assume that the program for download is stored in a main body device in advance.

In addition, the program medium is a storage medium arranged so that it can be separated from the main body. Examples of such a program medium include a tape, such as a magnetic tape and a cassette tape; a magnetic disk, such as a flexible disk and a hard disk; a disc, such as a CD/MO/MD/DVD; a card, such as an IC card (inclusive of a memory card); and a semiconductor memory, such as a mask ROM, an EPROM (erasable programmable read only memory), an EEPROM (electrically erasable programmable read only memory), or a flash ROM. All these storage media hold a program in a fixed manner.

Alternatively, if a system can be constructed which can connects to the Internet or other communications network, it is preferable if the program medium is a storage medium carrying the program in a flowing manner as in the downloading of a program over the communications network.

Further, when the program is downloaded over a communications network in this manner, it is preferable if the program for download is stored in a main body device in advance or installed from another storage medium.

A printing apparatus 1, according to the present embodiment, having a job pass-over function may include: (i) an information storing section 7 for storing print job information and print data in accordance with printing order; (ii) a control section 2 for controlling print job pass-over; and (iii) a correlation job judgment section 10 for judging correlation between (a) a current print job print-processed in response to receipt of the print job information and the print data from the information storing section 7, and (b) a proximate print job coming, in print order, before the current print job, in cases where the current print job is so judged as to cause print source shortage, the correlation job judgment section 10 judging whether or not the current job and the proximate print job are correlated with each other, in cases where the current job and the proximate print job are correlated with each other, the control section 2 never carrying out pass-over processing with respect to a print job coming, in the print order, after the current print job.

The printing apparatus 1 has such a pass-over function that the current print job is skipped and the next print job is printed in cases where there is no print source for the current print job. In cases where the current print job and the proximate print job are correlated with each other, the printing apparatus 1 prevents such inconvenience that the pass-over of the print job causes outputting (printing) to be carried out in order different from the print order in which the correlated jobs should be printed. Further, for example, when the print processing is passed over from (i) a job received from a user, to (ii) a job received from the same user, the user is required to wait for the passed job to be print-processed. So, it is more effective that the pass-over processing is carried out from (i) a job received from a user, to (ii) a job received from a different user. As such, the above structure never carries out the job pass-over processing between the print jobs which is so judged in accordance with a condition as to be correlated with each other. This makes it possible that the print processing is surely carried out in the print execution order.

The printing apparatus 1 according to the present embodiment may be arranged such that the proximate print job is a job that has already printed out. In cases where the current print job and the printed proximate print job are correlated with each other, the printing apparatus 1 prevents such inconvenience that: by passing over to a next print job, the correlated jobs are not printed in order in which the correlated jobs should be printed. Further, in cases where the same user produced the proximate print job and the current print job, the user can notice that there is no print source for the current print job when the user picks up the printed result of the proximate print job. This makes it possible to prevent the pass-over to the next print job.

The printing apparatus 1 according to the present embodiment may be arranged such that the current print job is not printed in cases where printout of the proximate print job is not completed, and where there is the print source for the current print job, and where the proximate print job and the current print job are correlated with each other. The printout of the proximate print job is not completed because there is no print source for the proximate print job. In cases where the current print job thus correlated with the proximate print job is printed, the outputting (printing; processing) is carried out in the order different from the print order in which the correlated jobs should be printed. The printing apparatus 1 allows prevention of such inconvenience.

The printing apparatus 1 according to the present embodiment may be arranged such that the pass-over processing is carried out assuming the current print job as the proximate print job, and assuming, as the current job, a print job coming after the current print job in the print order. The above structure never carries out printing when the current print job is correlated with the proximate print job, and prevents such inconvenience that incoming print job pass-over processing causes the printing to be carried out in the order different from the print order in which the correlated jobs should be printed, as is the case with the aforementioned pass-over processing.

The printing apparatus 1 according to the present embodiment may be arranged such that: when detecting that a print source is supplied for a job whose printout is not completed and which comes before the current print job in the print order, the processing of the current print job is suspended, and the processing of the job is preceded. The above structure makes it possible that, when the print source is supplied for the job which comes before current print job in the print order and whose print output is not completed due to the print source shortage, the processing of the job is preceded.

In the printing apparatus 1 according to the present embodiment, the detecting of the shortage of the print source for the current print job may be carried out during printout for the current print job. Even when the print source shortage suspends printout for a print job corresponding to a plurality of pages with a few pages left, the structure makes it possible to control the pass-over processing in a similar manner.

The printing apparatus 1 according to the present embodiment may be arranged such that the job correlation judgment is carried out in accordance with network addresses. Normally, the correlated jobs are almost always sequentially printed (transmitted) from the same PC (personal computer). Therefore, the use of the network address does not require any special setting for the judgment, but makes it possible that the correlated jobs are prevented from being outputted in the order different from the print order.

The printing apparatus 1 according to the present embodiment may be arranged such that, in cases where an interval between jobs falls within a predetermined time, the jobs are so judged as to be correlated with each other. Even when jobs are transmitted from the same PC, the jobs are not possibly correlated with each other. In light of this, in cases where there is a certain interval between the jobs or there is an interval longer than the interval, the jobs are so judged as to have no correlation with each other. With this, a printable (processible, executable) job transmitted from the same PC is outputted prior by way of the job pass-over processing.

The printing apparatus 1 according to the present embodiment may be arranged such that the job correlation judgment is carried out in accordance with job classification. Even when jobs are transmitted from the same PC, uncorrelated jobs are possibly printed sequentially from the PC. In light of this, the printing apparatus 1 makes it possible that only the correlated jobs designated by user are prevented from being outputted in the order different from the printed order.

The printing apparatus 1 according to the present embodiment may be arranged such that the job pass-over designation is utilized, and that the correlation job judgment is not carried out and the normal job pass-over processing is carried out when there is no job pass-over designation. The structure above allows the user to control the job pass-over processing by way of the job pass-over designation, upon the printing.

The printing apparatus according to the present invention is suitable for, e.g., a network printer, a digital multifunctional apparatus, an FAX, and the like, each of which receives jobs transmitted from a plurality of apparatuses via a network.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:
1. A printing apparatus, comprising:
 a job processing section for carrying out print processing resulting in forming an image with respect to received print jobs;
 a detecting section for detecting whether or not there is a source required for the print processing of each of the print jobs;
 a job control section for managing print processing order of the print jobs, and for controlling the job processing section such that a shortage print job is skipped and the print processing is carried out with respect to each of succeeding print jobs coming after the shortage print job in the print processing order, the shortage print job being either a print job that has order to be next print-processed, or a print job that is being print-processed, and the shortage print job being a print job which is so judged by the detecting section as to cause a shortage of the source; and
 a judgment section for judging whether or not the shortage print job and a print job which comes just before the shortage print job need to be consecutively print-processed, by comparing (i) print job information, which is included in the shortage print job and which includes at least identification information for identifying (1) a print processing condition of the print job and/or (2) the print job, with (ii) print job information of the print job which comes just before the shortage print job, and by judging a correlation between the shortage print job and the print job which comes just before the shortage print job in accordance with the comparison, in cases where the judgment section judges that the shortage print job and the print job which comes just before the shortage print job need to be sequentially print-processed because of the judged correlation between the shortage print job and the print job which comes just before the shortage print job, the print processing is suspended until supply of the source is detected by the detecting section, the job control section controlling the job processing section such that the shortage print job, judged to be print-processed in continuity with the print job which comes just before the shortage print job, is not skipped for print processing with respect to the succeeding print jobs coming after the shortage job, until completion of the print processing of the shortage print job.

2. The printing apparatus as set forth in claim 1, further comprising:
a history memory section for storing at least part of the print job information of the print job which comes just before the shortage print job.

3. The printing apparatus as set forth in claim 1, further comprising:
a correlation judgment section for sequentially judging whether or not the shortage print job and its succeeding print jobs need to be consecutively print-processed, by comparing (i) the print job information of the shortage print job with (ii) print job information of the succeeding print jobs in order in which the succeeding print jobs are print-processed, wherein:
the job control section controls the job processing section such that the shortage print job is skipped for the print processing with respect to (i) a succeeding print job which the correlation judgment section judged that the succeeding print job and the shortage print job do not need to be consecutively print-processed, and (ii) each of print jobs coming after the succeeding print job.

4. The printing apparatus as set forth in claim 1, wherein:
in cases where the judgment section judges that the shortage print job and the print job which comes just before the shortage print job do not need to be consecutively print-processed, the job control section controls the job processing section such that the shortage print job is skipped for the print processing with respect to a succeeding print job coming after the shortage print job.

5. The printing apparatus as set forth in claim 1, wherein:
in cases where the detecting section detects supply of a source required for the print processing of the shortage print job, when the shortage print job is skipped and the succeeding print job is print-processed, the job control section controls the job processing section such that ongoing print processing of the succeeding print job is suspended to carry out print processing of the shortage print job.

6. The printing apparatus as set forth in claim 1, wherein:
in cases where the detecting section detects supply of a source required for the print processing of the shortage print job, when the shortage print job is skipped and the succeeding print job is print-processed, the job control section controls the job processing section such that the print processing is carried out with respect to the shortage print job after completion of ongoing print processing of the succeeding print job.

7. The printing apparatus as set forth in claim 1, wherein:
the judgment section judges whether or not the shortage print job and the print job which comes just before the shortage print job need to be consecutively print-processed, in accordance with addresser information about the addresser who transmitted the print job which information is included in the print job information.

8. The printing apparatus as set forth in claim 7, wherein:
the addresser information is an IP address.

9. The printing apparatus as set forth in claim 7, wherein:
the addresser information is a name of a user who transmitted the print job.

10. The printing apparatus as set forth in claim 1, wherein:
the judgment section judges whether or not the shortage print job and the print job which comes just before the shortage print job need to be consecutively print-processed, by comparing (i) print job classification included in the print job information of the shortage print job, with (ii) print job classification included in the print job information of the print job which comes just before the shortage print job.

11. The printing apparatus as set forth in claim 7, wherein:
the judgment section judges whether or not the shortage print job and the print job which comes just before the shortage print job need to be consecutively print-processed, in accordance with an interval between (i) receipt time of the print job which comes just before the shortage print job and (ii) receipt time of the shortage print job.

12. The printing apparatus as set forth in claim 10, wherein:
the judgment section judges whether or not the shortage print job and the print job which comes just before the shortage print job need to be consecutively print-processed, in accordance with an interval between (i) receipt time of the print job which comes just before the shortage print job and (ii) receipt time of the shortage print job.

13. The printing apparatus as set forth in claim 1, wherein:
the job control section is able to switch between (i) a pass-over limit mode in which the job control section controls the job processing section such that the print processing of the succeeding print jobs is suspended until completion of the print processing of the shortage print job in cases where the judgment section judges that the shortage print job and the print job which comes just before the shortage print job need to be consecutively print-processed, and (ii) a pass-over mode in which the job control section controls the job processing section such that, irrespective of how the judgment section judged, the print processing of the shortage print job is skipped for the print processing with respect to the succeeding print job.

14. The printing apparatus as set forth in claim 1, wherein:
the job control section includes a flag setting section for setting a flag, indicative of whether or not the print job which comes just before the shortage print job and the shortage print job need to be consecutively print-processed, based on how the judgment section judged, and the job control section controls the job processing section in response to the flag.

15. The printing apparatus as set forth in claim 1, wherein:
the source is sheets needed for print processing.

16. A printing method for a printing apparatus, comprising the steps of:

(a) carrying out print processing in terms of forming images with respect to received print jobs;

(b) detecting whether or not there is a source required for the print processing of each of the print jobs;

(c) managing print processing order of the print jobs, and carrying out control such that a shortage print job is skipped and the print processing is carried out with respect to each of succeeding print jobs coming after the shortage print job in the print processing order, the shortage print job being either a print job that has order to be next print-processed, or that is a print job that is being print-processed, and the shortage print job being a print job which is so judged in the step (b) as to cause a shortage of the source; and (d) judging whether or not the shortage print job and a print job which comes just before the shortage print job need to be consecutively print-processed, by comparing (i) print job information, which is included in the shortage print job and which includes at least identification information for identifying (1) a print processing condition of the print job and/or (2) the print job, with (ii) print job information of the print job which comes just before the shortage print job, and by judging a correlation between the shortage print job and the print job which comes just before the shortage job in accordance with the comparison, in cases where the shortage print job and the a print job which comes just before the shortage print job are so judged in the step (d) that the shortage print job and the print job which comes just before the shortage print job are required to be sequentially print-processed because of the judged correlation between the shortage print job and the print job which comes just before the shortage print job, the print processing is suspended until supply of the source is detected by the detecting section, control being carried out in the step (c) such that the shortage print job, judged to be print-processed in continuity with the print job which comes just before the shortage print job, is not skipped for print processing with respect to the succeeding print job coming after the shortage job, until completion of the print processing of the shortage print job.

17. A computer-readable non transitory recording medium storing a control program for controlling a computer which controls a printing apparatus, said control program causing the computer to function as the respective sections of the printing apparatus as set forth in claim 1.

\* \* \* \* \*